(12) United States Patent
Marabese et al.

(10) Patent No.: US 10,384,739 B2
(45) Date of Patent: Aug. 20, 2019

(54) CONTROL SYSTEM OF THE TRIM OF VEHICLES WITH MORE THAN TWO WHEELS

(71) Applicant: Quadro Vehicles S.A., Vacallo (CH)

(72) Inventors: Riccardo Marabese, Gallarate (IT); Marco Moroni, Marnate (IT)

(73) Assignee: Quadro Vehicles S.A., Vacallo (CH)

( * ) Notice: Subject to any disclaimer, the term of this patent is extended or adjusted under 35 U.S.C. 154(b) by 0 days.

(21) Appl. No.: 15/319,348

(22) PCT Filed: Jun. 20, 2014

(86) PCT No.: PCT/IB2014/062471
§ 371 (c)(1),
(2) Date: Dec. 15, 2016

(87) PCT Pub. No.: WO2015/193705
PCT Pub. Date: Dec. 23, 2015

(65) Prior Publication Data
US 2017/0144720 A1    May 25, 2017

(51) Int. Cl.
| | | |
|---|---|---|
| *B62K 5/10* | (2013.01) | |
| *B60G 21/073* | (2006.01) | |
| *B60G 17/016* | (2006.01) | |
| *B60G 17/056* | (2006.01) | |
| *B60G 21/10* | (2006.01) | |

(Continued)

(52) U.S. Cl.
CPC ............ *B62K 5/10* (2013.01); *B60G 17/0162* (2013.01); *B60G 17/056* (2013.01); *B60G 21/073* (2013.01); *B60G 21/10* (2013.01); *B62K 5/027* (2013.01); *B60G 2204/82* (2013.01); *B60G 2204/8304* (2013.01); *B60G 2300/122* (2013.01); *B60G 2300/45* (2013.01); *B62K 2005/001* (2013.01)

(58) Field of Classification Search
CPC .... B62K 5/027; B62K 5/10; B62K 2005/001; B60G 17/0162; B60G 17/056; B60G 21/073; B60G 21/10; B60G 2300/122; B60G 2204/82; B60G 2204/8304
See application file for complete search history.

(56) References Cited

U.S. PATENT DOCUMENTS 3,112,923 A * 12/1963 Ley .................. B60G 15/12
                                                  267/186
4,047,732 A    9/1977 Williams et al.
(Continued)

FOREIGN PATENT DOCUMENTS

EP    1362779    11/2003
EP    2046589     4/2009
(Continued)

*Primary Examiner* — Laura Freedman
(74) *Attorney, Agent, or Firm* — Stetina Brunda Garred & Brucker

(57) ABSTRACT

The present invention relates to an improved control system of the trim of motorcycles with more than two wheels. More in particular, it relates to motorcycles which have at least three wheels and can lean sideways by virtue of the presence of a so-called wheel tilting system. The present invention improves on prior art HTS hydro-pneumatic systems, to improve the vehicle trim, particularly while cornering with the leaned vehicle.

11 Claims, 1 Drawing Sheet

(51) Int. Cl.
*B62K 5/027* (2013.01)
*B62K 5/00* (2013.01)

(56) References Cited

U.S. PATENT DOCUMENTS

| | | | | |
|---|---|---|---|---|
| 4,351,410 | A * | 9/1982 | Townsend | B62D 9/02 |
| | | | | 180/210 |
| 6,213,237 | B1 * | 4/2001 | Willman | B62H 1/12 |
| | | | | 180/209 |
| 8,286,978 | B2 * | 10/2012 | Marabese | B60G 17/0162 |
| | | | | 280/124.103 |
| 9,045,015 | B2 * | 6/2015 | Spahl | B60G 17/00 |
| 9,381,785 | B2 * | 7/2016 | Gale | B60G 3/145 |
| 9,381,940 | B2 * | 7/2016 | Gale | B60G 21/073 |
| 9,708,005 | B2 * | 7/2017 | Reusser | B62D 21/11 |
| 2010/0032915 | A1 | 2/2010 | Hsu et al. | |
| 2017/0174032 | A1 * | 6/2017 | Marabese | B60G 17/005 |

FOREIGN PATENT DOCUMENTS

| | | | | |
|---|---|---|---|---|
| GB | 2476807 | | 7/2011 | |
| WO | WO-9727071 | A1 * | 7/1997 | ......... B60G 17/0162 |
| WO | WO-0136253 | A1 * | 5/2001 | |
| WO | 0244008 | | 6/2002 | |
| WO | WO-2009087595 | A1 * | 7/2009 | ......... B60G 17/0162 |

* cited by examiner

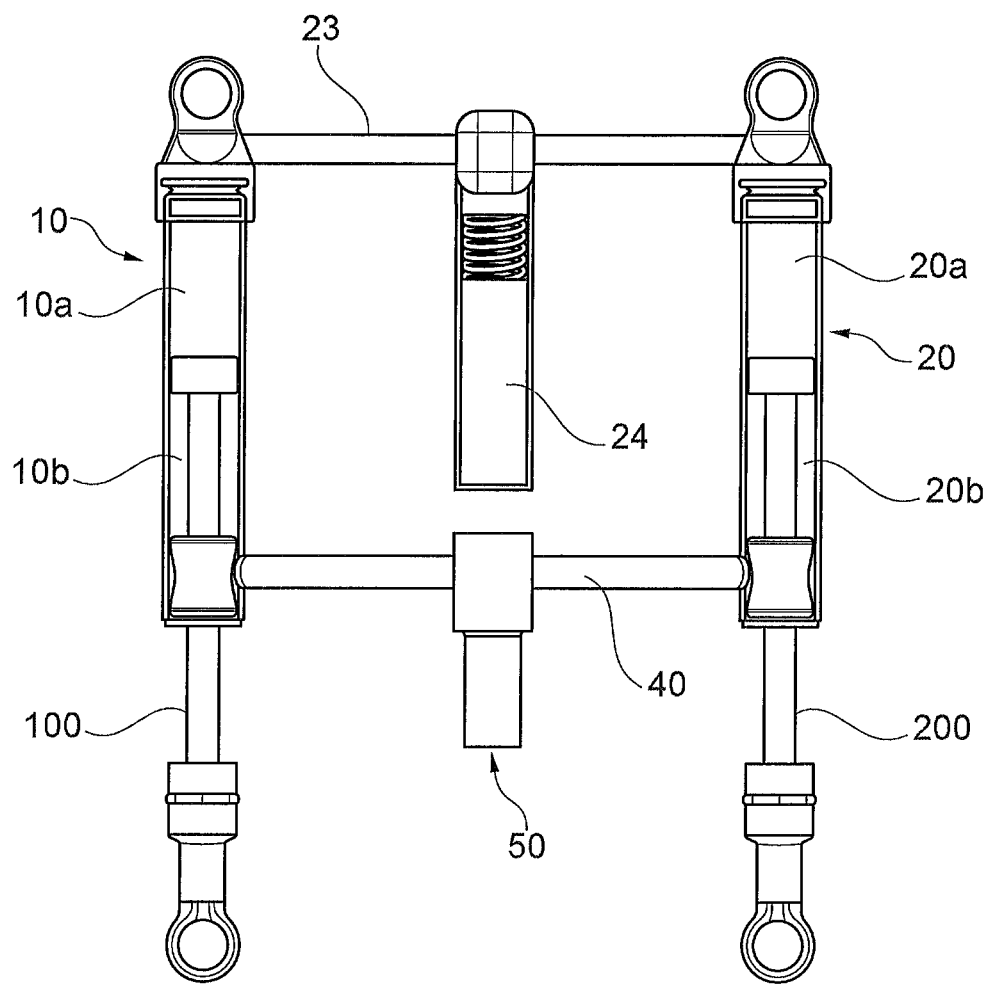

CONTROL SYSTEM OF THE TRIM OF VEHICLES WITH MORE THAN TWO WHEELS

CROSS REFERENCE TO RELATED APPLICATIONS

The present application claims priority to PCT International Application No. PCT/IB2014/062471 filed on Jun. 20, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to an improved control system of the trim of motorcycles with more than two wheels.

More particularly, it relates to motorcycles which have at least three wheels and can lean sideways by virtue of the presence of a so-called wheel tilting system.

DESCRIPTION OF THE PRIOR ART

As known in the prior art, the vehicles of the aforesaid type, in general, have three wheels, two of which, the front wheels, according to the most known constructions, are aligned on an axle and tilt by means of an either mechanical or hydraulic oscillation system, depending on the case.

The present invention thus relates, in particular, to three-wheel motorcycles, however the same invention may be effectively applied also to three-wheel motorcycles in which at least two wheels are aligned with each other on a same axle. Indeed, the vehicle wheels could be reciprocally offset or coupled but not perfectly aligned along a same axle.

The operating principle of the trim control system according to the present invention may indeed be effectively applied also in the case offset wheels, and may also apply to four-wheel tilting vehicles.

The prerogative of the motorcycles with more than two wheels to which reference is made here is that of being able to lean sideways by a given angle towards the inside of a curve while cornering, exactly as in a conventional two-wheel vehicle, motorcycle or bicycle.

In case of the three-wheel vehicles which are most common today (the known solutions of the prior art will be considered here by way of example), the tilting wheels are the two front wheels, which are coupled on the same axle.

The tilting function may be obtained on vehicles of known type by using a tilting mechanism, usually consisting of a system of levers which connect the hubs of the wheels paired along the same axle, which allows to the wheels of one side of the vehicle to move upwards with respect to the vehicle and to the wheels of the other side to move downwards, again with respect to the vehicle, by the same measure.

In the typical configuration, this mechanism includes a shock absorber, for example installed in a central position, including a spring and a damper, to absorb the irregularities of the ground and to control the longitudinal load transfers of the entire vehicle.

In the current form, said connection mechanism is mechanical, with longitudinal or transverse arms and various layouts already known in the sector of automotive or motorcycle design.

One mechanism guides the vertical movement of the two wheels, a second mechanism couples the right wheel to the left wheel to make the descending movement of one wheel correspond to an equal ascending movement of the opposite wheel, a third mechanism connects both wheels to the shock absorber, a fourth mechanism (in case of front wheels) allows the steering to guide the vehicle.

It appears evident that all these mechanisms may be complicated, bulky, heavy, expensive and difficult to optimize.

When driving on rough ground, an oscillation provoked on one wheel of one side of the vehicle may induce similar persistent oscillations on the other side, which may provoke a decrease of driving properties, both in terms of directional loss, and extensions of the braking distances.

Patent Application WO-0244008-A2 discloses a four-wheel motorcycle with a coupling system between the left wheel and the right wheel consisting of linkage connections between each wheel and one pair of dual-cylinder central dampers. This system is particularly complex because it includes many mechanical components and many rotating joints, ball joints and sliding joints which are expensive, complicated to assemble and may easily wear with use over time and eventually make the vehicle unusable or very expensive with regard to maintenance.

The simple mechanical joint between the left wheel and the right wheel cannot damp vibrations or oscillations which may occur when traveling on rough terrain or when the wheels start losing grip.

Other systems are known in the prior art for controlling motorcycle trims.

At one or both of the pairs of wheels of the motorcycle, EP-1362779-A2 shows one or more dampers directly between said wheels, or between said linkage system and a fixed point of the motorcycle chassis.

DE-9414724-U1 shows two hydraulic cylinders independently connected at the two ends by means of pipes. Oil is present in the cylinders and can flow between them by means of pipes. Cylinder pistons divide the chambers of the cylinders into two parts, which are not communicating, so that the movement of the oil in the two upper cylinders corresponds to an opposite movement in the lower chambers.

WO-97127071 and WO-0244008-A2 show two hydraulic cylinders interdependently connected at the upper end by means of a pipe, with or without an accumulator connected to the pipe. The lower chambers under the pistons in the cylinders are empty and the pistons are free to move according to the motorcycle trim.

Finally, the Applicant is owner of European Patent EP 2 046 589 which relates to a hydro-pneumatic system comprising a pair of cylinders, one for each tilting wheel, in which the upper part of the cylinders contains oil, while the lower part contains gas.

The known systems are not completely free of drawbacks. For example when the leaning of the motorcycle is about to reach the grip limit of the tires, these known systems do not help to limit the negative effects of the increase of the leaning angle, or of an accidental fall.

The hydro-pneumatic system of Patent EP 2 046 589 overcomes these drawbacks by virtue of the fact that the gas contained in the lower chamber of the cylinders wheels imparts a thrust to the wheels capable of supporting the vehicle on corners, allows a better road-holding on corners, which translates into a greater feeling of driving safety, and thus higher driving comfort.

So, despite constituting a considerable improvement of the prior art, the hydro-pneumatic solution developed by the same Applicant and object of Patent EP 2 046 589, which will be indicated hereinafter as HTS, acronym of "hydraulic tilting system", may display limits in off-road driving, i.e. in driving conditions on rough terrain, or on track racing conditions, in which the "straightening" thrust caused by the compressed gas present in the lower part of the cylinders may create suspension reactions which are counterproductive for the user.

SUMMARY OF THE INVENTION

Consequently, the main task of the present invention is to improve the HTS hydro-pneumatic system developed by the Applicant which is the object of Patent EP 2 046 589 so as to improve the vehicle trim, above all on corners with the vehicle leaning.

Within this task, it is the object of the present invention to neutralize an undesired straightening effect which may occur on corners with a high leaning angle of the vehicle.

A further object of the present invention is to supply an improved hydro-pneumatic tilting system of a vehicle with more than two wheels which may be activated and deactivated either manually or by means of the intervention of an electronic control unit thus allowing to modify the vehicle trim.

This and other tasks are reached by a hydro-pneumatic system according to appended claim 1.

Further features are described in the dependent claims.

BRIEF DESCRIPTION OF DRAWINGS

Further objects and advantages of the present invention will be apparent in the detailed description of an embodiment shown by way of non-limiting example in the accompanying FIG. 1, which shows an overview of the improved hydro-pneumatic tilting system of a vehicle with more than two wheels according to the present invention.

DESCRIPTION OF THE PREFERRED EMBODIMENT

The improved hydro-pneumatic tilting system of a vehicle with more than two wheels according to the present invention comprises at least one first hydraulic cylinder 10 and one second hydraulic cylinder 20 arranged in fluid communication by means of first hydraulic connection means 23.

Said first hydraulic connection means 23 may advantageously consist of a conduit, more preferably a pipe, which puts into hydraulic communication, in particular, the first 10a and second 20a upper chamber of said first 10 and second 20 hydraulic cylinder, respectively, in which oil is contained, as known from the tilting system HTS developed by the Applicant. The first 10b and second 20b lower chamber of said first 10 and second 20 hydraulic cylinder, respectively, contain pressurized gas.

When the vehicle leans, the piston corresponding to the wheel inside the curve, for example the first piston 100 associated with said first cylinder 10, pushes the oil contained in the first upper chamber 10a of the cylinder itself into the second upper chamber 20a of the opposite cylinder, in this case the second cylinder 20 by means of the first connection pipe 23, thus moving the two wheels connected to the first 100 and second 200 piston in opposite directions.

An accumulator 24, with an end part hydraulically connected to the connection pipe 23 may be present. A rotary piston (or septums or baffles) is present in the accumulator 24 which forms a chamber that contains a pressurized gas, having a spring function. In case of rough terrain, which may cause a sudden movement of a single wheel, the movement of the fluid is partially damped by the accumulator, without immediately flowing towards the other wheel causing its immediate movement.

A pressurized gas is present in the system which fills the lower part of the cylinders. This solution maintains circuit functionality by introducing two important features: when the leaning angle increases, the available space for the gas contained in the cylinder outside the corner decreases and its pressure increases, thus increasing the "resistance" of the system to further increase the leaning angle. This is very effective to help the driver "feel" the angle at which leaning starts to become dangerous because the grip limit of the tires is about to be reached.

Another advantage is the straightening effect imparted by the pressurized gas: by virtue of the presence of the pressurized gas in the lower chamber located on the side of the vehicle outside the curve, when the driver needs to straighten the vehicle out of curve or must rapidly change direction by rapidly inclining the vehicle on the opposite side, for example to run on a series of curves and counter-curves, the vehicle straightens very rapidly and effortlessly for the driver.

However, it is precisely the presence of the pressurized gas in the lower chamber of the cylinder which is compressed in the cylinder on the outside of the curve when cornering that determines an undesired effect in case of rough terrain.

Indeed, in the case of rough terrain tackled transversely, which causes a compression in the cylinder upstream of the inclined plane, for example the first cylinder 10, the oil present in the first upper cylinder 10a of said first cylinder 10 transits through said first hydraulic connection pipe 23 towards the second upper chamber 20a of said second cylinder 20, thus causing a further compression of the gas present in the second lower chamber 20b of said second cylinder 20. Said further compression of the gas causes a lateral thrust which may destabilize the vertical trim of the vehicle.

Similarly, a deep hole or large pothole may have a negative effect on the vehicle trim, again because of the compressed gas in the lower part of the cylinders both on a straight line and on corners.

However, also in absence of roughness, it may be desirable for the driver to either reduce or entirely eliminate the straightening effect caused by the pressurized gas in the cylinder on the outside of the corner. For example, if the driver wants to lean the vehicle at accentuated angles at higher speed (a prerogative of track racing driving) without "feeling" front end resistance caused, also in this case, by the presence of pressurized gas in the lower part of the external cylinder.

The hydro-pneumatic tilting system according to the present invention allows to solve these drawbacks by virtue of the fact of comprising further second connection means 40 which put the first 10b and the second 20b lower chamber of said first 10 and second 20 cylinder into fluid communication, further gas shut-off means 50 being provided on said second connection means 40.

Said second hydraulic connection means preferably consist of a rigid pipe or a flexible hose.

Said shut-off means 50 adjust the gas flow through said second connection means 40 by either separating or putting into fluid communication the two lower chambers 10b and 20b of said cylinders.

Said shut-off means 50 preferably consist of a valve, which can be actuated by the driver, for example by means of a button or a lever type control or which can be actuated by a control unit which processes different indicative signals of the trim and of the dynamic conditions of the vehicle in all instants.

Such a valve may be electrically actuated by a solenoid or stepper motor.

When the shut-off means 50 are controlled by the driver, the driver may choose the best trim configuration as a function of the type of path.

The operation of the system is as follows.

When the shut-off means 50 are closed, the improved hydro-pneumatic system according to the present invention behaves like the traditional system, in which the lower chambers 10b, 20b of the cylinders which contain gas are separated from each other and the gas present in a cylinder is compressed as the volume of the chamber in which is contained decreases, thus determining the straightening thrust of the hydro-pneumatic tilting system free from the second connection means 40.

When shut-off means 50 are open, the gas may freely transit from one cylinder to the other, in particular from a lower chamber 10b, 20b to the other by means of said second connection means 40.

Thus, in this configuration of the system, when the vehicle is leaning when cornering, the gas contained in the lower chamber of the cylinder outside the curve, instead of being compressed inside the chamber itself, may flow towards the chamber of the opposite cylinder. If the shut-off means are entirely open, the gas will flow completely from one chamber to the other pushed by the movement of the pistons either completely canceling out or in any case drastically limiting the straightening effect because there will be no difference of pressure in the lower chambers of the cylinders.

By operating on the valve, either the driver or the electronic control system of the vehicle may advantageously opt for intermediate configurations so as to decrease, but not completely cancel out, the compression of the gas and thus the respective difference of pressure in the lower chambers of the cylinders, so as not to completely cancel out the consequent straightening effect.

Given the description of the system, it is worth noting that the driver may take the shut-off valve 50 instant by instant, at their discretion, from the closed position to the open position, also when fully cornering, or the valve may be advantageously opened by an electronic control unit according to the dynamic parameters of the vehicle, such as speed, centrifuge acceleration, sudden tilting of the wheels caused by potholes in the ground and so on, while care must be adopted when passing from the open position to the closed position of the shut-off valve 50, because the valve must be closed with the volume of the lower cylinders being in equal condition, the pressure conditions in the chambers being equal.

The condition of equality of the volumes of the chambers is obtained when the tilting system is aligned, i.e. when the vehicle is not leaning.

Thus, by way of example, the shut-off valve 50 may be closed with the vehicle stopped on flat surface, better if with the vehicle on the central stand.

In all cases, the tilting system according to the present invention may advantageously equip a vehicle trim control system which enables the closing of the shut-off valve 50. Said vehicle trim control system may comprise a leaning sensor or a sensor able of measuring the extension of the rods of said first 100 and second 200 piston, or means able of detecting the inclination of the suspension arms, or other similar means able of detecting the condition of tilting system aligned corresponding to the equality of the volumes of said lower chambers 10b, 20b.

For example, in the condition of vehicle supported by the central stand on flat surface, the volumes of the lower chambers 10b, 20b of said first 10 and second 20 cylinder of the hydro-pneumatic system according to the present invention are equal and the gas volume is distributed equally in the two chambers, this condition being essential for the correct operation of the tilting system.

Many changes, modifications, variations and other uses and applications of the subject invention will be apparent to a person skilled in the art after having considered the description and the accompanying drawings which illustrate preferred embodiments thereof. Such changes, modifications, variations and other uses and applications which do not differ from the scope of the invention as defined in the appended claims and form an integral part of the text are covered by the present invention.

The invention claimed is:

1. A hydro-pneumatic tilting system of a vehicle with more than two wheels, said vehicle having at least two wheels tilting by means of said hydro-pneumatic system, the system comprising at least one first hydraulic cylinder and a second hydraulic cylinder each associated to a respective tilting wheel of the vehicle, said at least one first hydraulic cylinder and second hydraulic cylinder respectively comprising first and second upper chambers containing oil, and first and second lower chambers containing pressurized gas, the system being characterized in that the system comprises second connection means which puts said first lower chamber and said second lower chamber into fluid communication, so that said gas may flow from one cylinder to the other cylinder.

2. The tilting system according to claim 1, characterized in that said second connection means comprises shut-off means adapted to adjust the gas flow which transits from one cylinder to the other cylinder by means of said second connection means.

3. The tilting system according to claim 2, characterized in that said second connection means comprises a pipe.

4. The tilting system according to claim 2, characterized in that said shut-off means comprises a mechanically or electrically actuated valve.

5. The tilting system according to claim 4, characterized in that said valve is configured to be controlled by a driver by means of a manual actuating system.

6. The tilting system according to claim 4, characterized in that said valve is automatically controlled by an electronic control unit.

7. The tilting system according to claim 6, characterized in that said electronic control unit further comprises a vehicle trim control system, which controls switching of said valve from an open position to a closed position.

8. The tilting system according to claim 7, further comprising a leaning sensor adapted to send an enable signal for closing a shut-off valve to said electronic control unit.

9. The tilting system according to claim 7, further comprising a sensor adapted to detect extension of to rods of said first and second cylinders and to send an enable signal for closing a shut-off valve to said electronic control unit.

10. The tilting system according to claim 2, characterized in that said shut-off means comprises a proportioning valve.

11. A tilting system according to claim 2, characterized in that said shut-off means comprises an on-off valve.

* * * * *